March 16, 1965

R. P. LOTTMAN 3,173,294

CALORIMETER DEVICE FOR MEASURING THE TEMPERATURE
OR SPECIFIC HEAT OF MINERAL
AGGREGATES OR THE LIKE

Filed Nov. 13, 1961

INVENTOR.
ROBERT P. LOTTMAN
BY
MAHONEY, MILLER & RAMBO
BY
ATTORNEYS

United States Patent Office 3,173,294
Patented Mar. 16, 1965

3,173,294
CALORIMETER DEVICE FOR MEASURING THE TEMPERATURE OR SPECIFIC HEAT OF MINERAL AGGREGATES OR THE LIKE
Robert P. Lottman, Columbus, Ohio, assignor to The Ohio State University, Columbus, Ohio
Filed Nov. 13, 1961, Ser. No. 151,795
3 Claims. (Cl. 73—190)

This invention relates to calorimetric apparatus and, more particularly, to a novel and improved calorimeter device for measuring the temperature or the specific heat of mineral aggregates.

Manufacturing or construction industries utilizing mineral aggregates are frequently concerned with the temperature or specific heat of the material being processed as a usable indicia for quality control. As a specific example, in the production of bituminous asphalt mixtures of the type used as paving or road surfacing material, it is necessary to heat the mineral aggregates to a temperature approximately 300° F., along with a simultaneous reduction of the moisture content, before mixing the aggregates with the preheated asphaltic material. This temperature has been determined by practice to be the optimum for assuring good adhesion of the asphalt to the mineral aggregates and a homogeneous mixture. When the mineral aggregates are at a lower temperature, mixing with the preheated asphalt produces premature cooling during paving operations, and results also in greater residual moisture which causes separation and foaming of the mixture. Separation and foaming are undesirable characteristics and, consequently, the mix will be rejected for nonconformance with the applicable specifications. Accurate control of the temperature during the heating and drying operations for the mineral aggregates, although vital for production of a satisfactory mix, has not been possible due to the inadequate temperature measuring apparatus previously utilized. The apparatus heretofore employed has consisted of mercury thermometers or electric thermocouples placed in direct contact with the material at sampling points during the heating and drying operation. Application of these temperature measuring methods has been uniformly unsuccessful due to the unknown effects of mineral aggregate cooling and the temperaure of the air in the void spaces between mineral aggregate particles. Inaccurate results are, therefore, obtained which prevent control of the heating apparatus within the degree of accuracy required.

It is, therefore, the primary object of this invention to provide a calorimetric device for accurately determining the temperature or specific heat of mineral aggregates or other insoluble bulk solids.

It is also an object of this invention to provide a calorimetric device for determining the temperature or specific heat of a sample of a solid particle type material in which the sample to be tested is immersed in a body of liquid to obtain an accurately measurable thermal equilibrium from which the temperature or specific heat of the material may be readily calculated.

It is another object of this invention to provide a calorimetric device for accurately determining the temperature or specific heat of a sample of a solid particle type material in which the material to be tested is immersed and agitated within a body of liquid of known weight and temperature to rapidly attain a measurable thermal equilibrium between the liquid and the material being tested.

It is a further object of this invention to provide a calorimetric device for accurately determining the temperature or specific heat of a sample of a solid particle type material that is simple to use and which may be economically constructed as a portable instrument capable of withstanding relatively severe operating conditions such as may be encountered in field use.

These and other objects and advantages of this invention will be readily apparent from the following detailed description and accompanying drawings, in which.

Figure 1:
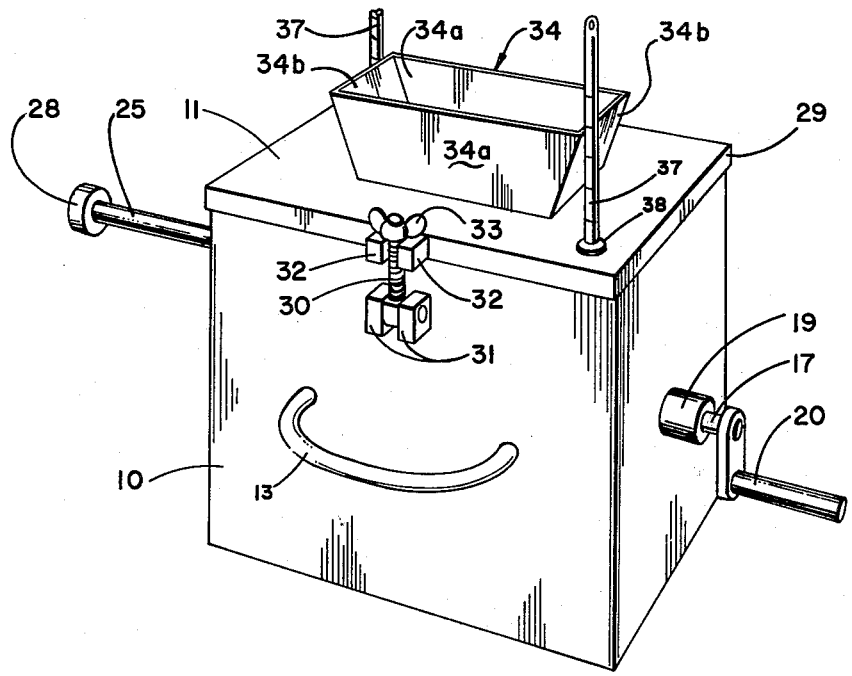
FIG. 1 is an isometric view of the present calorimeter device.
Figure 2:
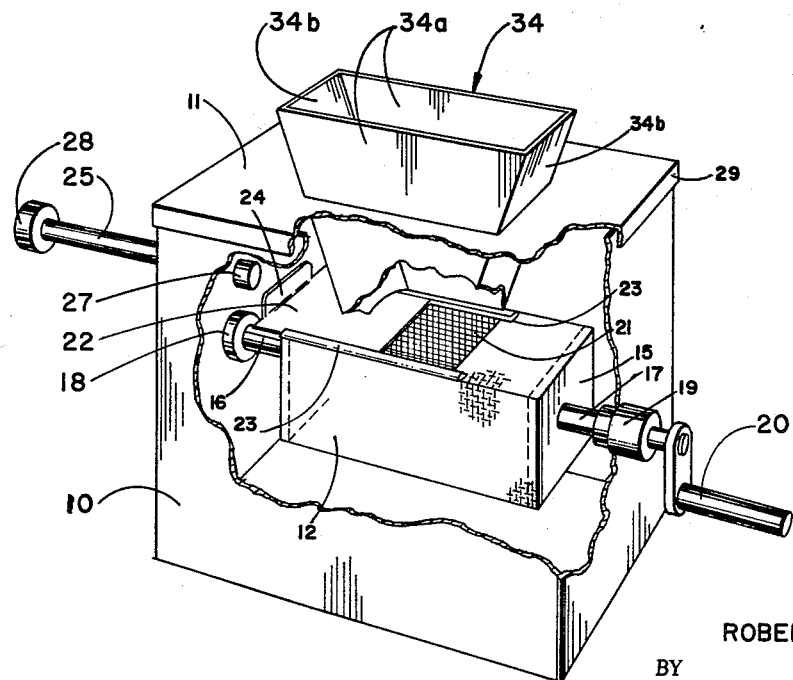
FIG. 2 is a similar view with a portion of the case broken away to show the revolving aggregate basket of the device.

Referring to the drawings, the present calorimeter device comprises a rectangular, open top case 10 provided with a removable lid 11 and a sample-receiving basket 12 rotatably mounted within the case. The case 10 is dimensioned to receive a quantity of liquid which is sufficient for complete immersion of the basket 12 and proper calorimetric operation. Preferably, the case 10 and lid 11 are fabricated from relatively lightweight sheet metal to minimize the weight of the calorimeter device and thereby facilitate its use. A pair of carrying handles 13 are provided on the outer side walls of the case for convenience in handling.

The sample-receiving basket 12 is of generally square cross-section and is mounted for rotation about a horizontal axis within the central portion of the case 10. The basket 12 is horizontally disposed between the end walls of the case 10 with each end spaced an equal distance inwardly from the adjacent end wall. The opposite ends of the basket 12 are closed by plates 15 to which are connected a pair of opposite, axially extending trunnions 16 and 17. The trunnions 16 and 17 are journalled in bearings 18 and 19, respectively, extending through the opposite end walls of the case 10 to support the basket 12 a distance above the bottom of the case. Since the basket 12 is immersed in liquid during the operation of the calorimeter, it is necessary that the bearings 18 and 19 form a liquid impervious seal with the respective trunnions 16 and 17. Trunnion 17 extends a distance outwardly from the case 10 through the bearing 19. Rigidly secured to the external end of the trunnion 17 is a hand crank 20 for imparting rotation to the basket 12.

To facilitate free circulation of the liquid through the basket 12 and permit the liquid to contact all portions of a sample of material placed therein, the main body portion of the basket is preferably fabricated from an open mesh metal fabric. A material, such as copper, may be advantageously utilized for the metal fabric to prevent corrosion and thereby avoid frequent replacement of the basket. The mesh size is determined by the particular material with which the calorimeter will be utilized.

Formed in one side of the basket 12 is an opening 21 which communicates with the basket interior. The opening 21 is rectangular in shape having a width substantially equal to that of the basket and extending longitudinally a distance to either side of the center of the basket. A closure plate 22 is provided for the opening 21. The plate 22 is of substantially the same dimensions as the opening 21 and is mounted for longitudinal reciprocating movement along the side of the basket adjacent the opening. The longitudinal marginal adges of the plate 22 are slidably disposed in a pair of channel guides 23 secured to the basket. Each channel guide 23 is positioned parallel to a longitudinal side of the opening 21 and extends toward the end of the basket 12 supported by the trunnion 16. Manual movement of the plate 22 is facilitated by an outwardly turned flange 24 integrally formed along one end of the plate.

Figure 3:
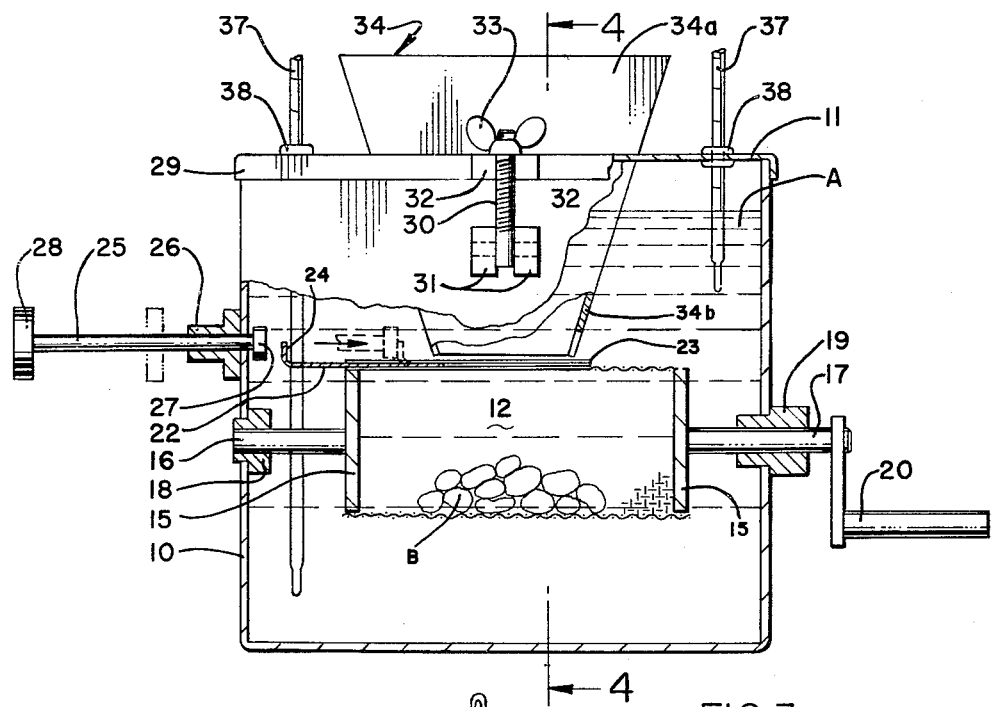
FIG. 3 is a vertical sectional view, partially in elevation, taken through the calorimeter device.

Although the plate 22 may be readily moved out of registration with the opening 21 before the case 10 is filled with a liquid and the lid 11 is replaced, closing movement of the plate into registration with the opening is advantageously accomplished by an externally operated, horizontally movable push rod 25. The push rod comprises an elongated cylindrical rod slidably disposed in a bushing 26 mounted adjacent an opening located in the end wall of the case 10 adjacent the flanged end of the plate 22. Fixed on the inner end of the rod 25 is a cylindrical flange-contacting button 27. A knob 28 is secured to the outer end of the push rod 25. Thus, assuming the plate 22 to be open, the same may be closed simply by pushing inwardly upon the knob 28 of the push rod 25, as indicated by broken lines in FIG. 3 of the drawings.

The lid 11 of the case is a flat, rectangular plate having a downwardly extending peripheral flange 29 integrally formed therewith. Securing the lid 11 to the case 10 are a pair of clamp bolts 30. Each bolt 30 is pivoted at one end between a pair of lugs 31 externally attached to the upper marginal edge of the side wall of the case. When the lid 11 is placed on the care, the free end of each bolt is disposed between a pair of lugs 32 attached to the flange 29. The necessary clamping force is provided by a wing nut 33 threaded on the free end of each bolt 30 above the lugs 32.

Figure 4:
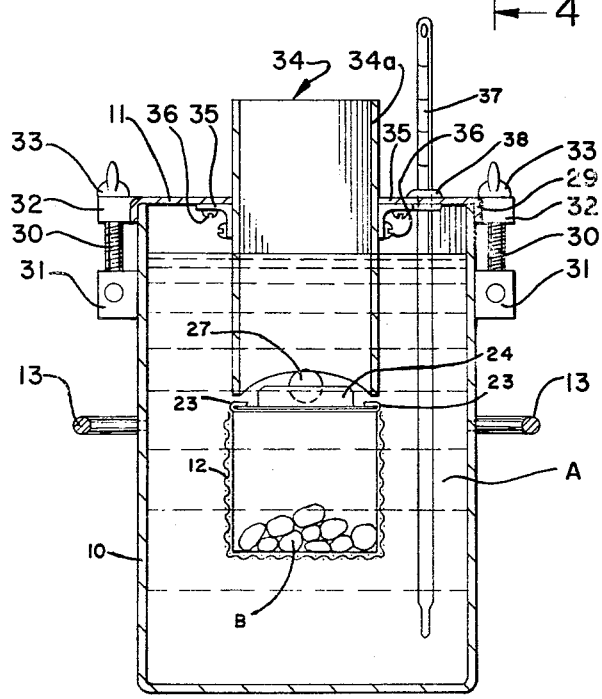
FIG. 4 is a transverse vertical sectional view taken along line 4—4 of FIG. 3.

To obtain the most satisfactory results with the calorimeter, it is desirable that a sample of material be placed in the basket 12 after the case 10 heas been filled to the desired level with a liquid of known specific heat and temperature. For this purpose, the lid 11 is provided with a funnel 34 which forms an inlet means to facilitate the introduction of a sample of material into the basket 12 after closure of the lid 11. The funnel 34 is securely mounted in an opening in the lid 11, and extends a distance downwardly into the interior of the case 10 in alignment with the basket 12. The funnel 34 is preferably formed with parallel, vertically disposed side walls 34a and inwardly and downwardly tapering end walls 34b, and terminates in a rectangularly shaped outlet opening substantially equal in size to the opening 21 of the sample basket. Each of the side walls 34a terminates immediately above the basket 12, while the tapered end walls 34b terminate in arcuately concave lower edges to provide sufficient clearance for the free rotation of the basket. Rigidly securing the funnel 34 to the lid 11 are a pair of angle brackets 35 (see FIG. 4) attached to the side walls 34a of the funnel and the lid 11 by machine screws 36.

Measurement of temperature of the liquid within the calorimeter may be conveniently accomplished by two mercury column thermometers 37. The thermometers 37 are removably and frictionally carried in rubber grommets 38 mounted in access openings formed in diagonally opposed corners of the lid 11. Preferably, the bulbs of the thermometers 37 will be positioned at different levels within the case 10 (FIG. 3), to prevent inaccuracy of temperature calculation due to a differential in temperature at various levels within the liquid.

Calculation of temperature or specific heat is based on the well known principles of physics relating to the transfer of heat between a solid and a non-solvent liquid at initially different temperatures. This principle is expressed by the well known formula:

$$WaCa(T_{ia} - T_{fw}) = WwCw(T_{fw} - T_{iw})$$

in which:

$Wa$ = weight of the solid;
$Ww$ = weight of the liquid;
$Ca$ = specific heat of the solid;
$Cw$ = specific heat of the liquid;
$T_{ia}$ = initial temperaure of the solid before immersion;
$T_{iw}$ = initial temperature of the liquid;
$T_{fw}$ = final temperature of the liquid.

The weights $Wa$ and $Ww$ of the solid and liquid may be determined by weighing the same in any convenient manner, and the initial and final temperatures, $T_{iw}$ and $T_{fw}$, of the liquid may be obtained from the calorimeter thermometers. Assuming that the specific heats $Ca$ and $Cw$ of the solid and the liquid are known or have been previously determined, the initial temperature $T_{ia}$ of the solid may be calculated by solving the above formula for this temperature and substituting the known or determined values for the other terms. Similarly, assuming that the initial temperature $T_{ia}$ of the solid is known, the specific heat $Ca$ may be calculated, if desired, through the application of the same formula.

In utilizing the present calorimeter device, it is necessary to first remove the lid 11 to permit movement of the plate 22 out of registration with the opening 21 in the basket 12. The case 10 is then partially filled with a known weight of water or other liquid A having a known specific heat $Cw$ and the lid 11 is replaced on the case. At this time the initial temperature $T_{iw}$ of the liquid is determined by the thermometers 37 supported by the lid 11 and having their bulbs immersed in the liquid. A sample of material B of known weight is poured into the basket 12 through the funnel 34 after first assuring that the basket is positioned to align the opening 21 with the lower end of the funnel. The closure plate 22 is then moved to a closing position over the basket opening 21 by pushing inwardly upon the knob 28 of the push rod 25. After retracting the push rod 25 to its extreme outer position, the basket 12 is manually rotated for a period of time by means of the crank 20 until a thermal equilibrium is obtained between the liquid A and the material B. The final temperature $T_{fw}$ of the liquid is then observed from the thermometers 37 and the initial temperature $T_{ia}$ of the material may thereafter be calculated, using the foregoing mathematical equation or formula.

In view of the foregoing, it will be readily apparent that the calorimeter device of this invention is particularly suitable for use by industries utilizing solid particle type materials such as mineral aggregates where it is necessary or desirable to accurately determine process temperatures. The portability and ruggedness of the calorimeter device greatly facilitates its use at any location convenient to the processing apparatus. The temperature or specific heat of the material may be quickly determined thereby permitting any necessary corrective action to be taken at the most advantageous time. A calorimeter device constructed in accordance with this invention is not only capable of withstanding adverse operating conditions, but is simple and economical to fabricate and use.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A calorimeter device comprising an open top, liquid-receiving case provided with a removable lid, a perforate sample-receiving basket mounted for rotation within said case and disposed wholly within the confines of said case; inlet means connected with said lid for facilitating the introduction of a sample of material into said basket, said basket being formed from open mesh wire and having an opening through which a sample of material may be passed interiorly of said basket by way of said inlet means and a movable plate for selectively closing said opening; means connected with said basket and extending externally of said case for rotating said basket; an exteriorly accessible push rod extending through a wall of said case and engageable with said plate to move the latter to a closing position with respect to the sample-receiving opening of said basket; and temperature-indicating means carried in association with said case for indicating the temperature of a liquid received therein.

2. A calorimeter device comprising a liquid-receiving case having an open top; a perforate sample-receiving basket disposed wholly within the confines of said case and mounted for rotation therein; an exteriorly accessible hand crank carried by said case for imparting axial rotation to said basket, said basket having an opening through which a sample of material may be passed interiorly of said basket; a plate slidably carried by said basket and movable to a position to close the opening of said basket; an exteriorly accessible push rod extending through a wall of said case and engageable with said plate to move the latter to a position closing the opening of said basket; a removable lid for closing the top of said case, said lid having a funnel connected therewith for facilitating the introduction of a sample of material into said basket; and a thermometer removably carried by said lid for indicating the temperature of a liquid received in said case.

3. A calorimeter device comprising a liquid-receiving case including a removable lid provided with an inlet through which materials may be introduced within said case; a perforate, sample-receiving basket rotatably carried within the confines of said case and having an opening arranged for alignment with the inlet of said lid and through which a sample of material introduced through said inlet may be passed into said basket; exteriorly accessible means extending through a wall of said case and connected with said basket for rotating said basket; and temperature-indicating means carried by said case for indicating the temperature of a liquid received in said case.

References Cited by the Examiner
UNITED STATES PATENTS 1,223,120   4/17   Stohn et al. _____ 73—427 X

FOREIGN PATENTS 893,283   1/44   France.

RICHARD C. QUEISSER, *Primary Examiner.*

JOHN P. BEAUCHAMP, *Examiner.*